(12) United States Patent
Chen et al.

(10) Patent No.: US 8,958,381 B2
(45) Date of Patent: Feb. 17, 2015

(54) METHOD AND DEVICE FOR CONTROLLING TIMER ON BUFFER STATUS REPORT

(75) Inventors: Li Chen, Beijing (CN); Yali Zhao, Beijing (CN); Fangli Xu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 211 days.

(21) Appl. No.: 13/638,467

(22) PCT Filed: Jun. 21, 2011

(86) PCT No.: PCT/CN2011/076018
§ 371 (c)(1),
(2), (4) Date: Sep. 28, 2012

(87) PCT Pub. No.: WO2011/160574
PCT Pub. Date: Dec. 29, 2011

(65) Prior Publication Data
US 2013/0021917 A1 Jan. 24, 2013

(30) Foreign Application Priority Data
Jun. 21, 2010 (CN) .......................... 2010 1 0212447

(51) Int. Cl.
*H04W 4/00* (2009.01)
(52) U.S. Cl.
USPC ....................................................... 370/329
(58) Field of Classification Search
CPC ..... H04W 80/04; H04W 88/06; H04W 28/04; H04W 72/04
USPC ................................................ 370/328, 329
See application file for complete search history.

(56) References Cited

U.S. PATENT DOCUMENTS

2010/0034147 A1 2/2010 Ho et al.
2010/0150082 A1 6/2010 Shin et al.

FOREIGN PATENT DOCUMENTS

| CN | 101562894 A | 10/2009 |
| CN | 102082646 A | 6/2011 |
| EP | 2182770 A2 | 5/2010 |

OTHER PUBLICATIONS

Author Unknown, "Clarification on BSR trigger—Document R2-095622," ASUSTeK Computer Inc., 3GPP TSG-RAN Meeting #67 bis, Oct. 2009, 5 pages.

(Continued)

*Primary Examiner* — Ronald Abelson
(74) *Attorney, Agent, or Firm* — Kilpatrick Townsend & Stockton LLP

(57) ABSTRACT

A method for controlling a timer on buffer status report (BSR) is provided in the present invention, and the method is applied to implement the control of the timer on BSR the system to which Carrier Aggregation technology is applied. Said method includes: starting a retransmission BSR timer (retxBSR-Timer) and a BSR periodic reporting timer (periodicBSR-Timer) when a sub frame has a component carrier which has a BSR to be transmitted; restarting the retxBSR-Timer when a sub frame has a component carrier which has new data transmission resources; and restarting the periodicBSR-Timer when a sub frame has a component carrier which has a long BSR or a short BSR to be transmitted. A device for implementing said method is also provided in the present invention.

4 Claims, 9 Drawing Sheets

(56) References Cited

OTHER PUBLICATIONS

Author Unknown, "BSR reporting in Carrier Aggregation—Document R2-103277," Alcatel-Lucent Shanghai Bell, 3GPP TSG-RAN WG2 Meeting #70, May 2010, 4 pages.
"3rd Generation Partnership Project; Technical Specification Group Radio Access Network; Evolved Universal Terrestrial Radio Access (E-UTRA); Medium Access Control (MAC) protocol specification (Release 8)", 3GPP Standard; 3GPP TS 36.321, $3^{rd}$ Generation Partnership Project (3GPP), Mobile Competence Centre; 650, Route Des Lucioles; F-06921 Sophia-antipolis Cedex, France, No. V8.9.0, Jun. 18, 2010, pp. 1-47, XP050441952, [retrieved on Jun. 18, 2010].
Alcatel-Lucent Shanghai Bell et al: "BSR reporting in Carrier Aggregation", 3GPP TSG-RAN WG2 Meeting #70, R2-103277, May 10, 2010-May 14, 2010.
European Search Report for EP 11797605 (counterpart EP application).
Office Action for EP 11797605 (counterpart EP application).

METHOD AND DEVICE FOR CONTROLLING TIMER ON BUFFER STATUS REPORT

This application is a U.S. National Stage application of International Application No. PCT/CN2011/076018, filed Jun. 21, 2011, designating the United States, and claims the benefit of Chinese Patent Application no. 201010212447.7, filed with the Chinese Patent Office on Jun. 21, 2010 entitled "Method of and device for controlling timer on buffer status report", which is hereby incorporated by reference in its entirety.

FIELD OF THE INVENTION

The present invention relates to the field of communications and particularly to a method and device for controlling a timer on a buffer status report.

BACKGROUND OF THE INVENTION

The technology of Carrier Aggregation (CA) has been introduced into a Long Term Evolution-Advanced (LTE-A) system in view of required improved peak rates, compatibility with a Long Term Evolution (LTE) system and full use of frequency resources. The technology of carrier aggregation refers to that there are a plurality of Component Carriers (CCs) respectively in the uplink and the downlink in a cell, and a component carrier is also referred to as a separate cell and the CC(s) serving a UE is also referred to a serving cell. In the LTE Release 8 (R8), a sub-frame includes only one Transport Block (TB) including a Media Access Control Packet Data Unit (MAC PDU). With the introduction of CA, a plurality of transport blocks can be transmitted in a sub-frame, and a transport block can be transmitted over each CC with each transport block including an MAC PDU. Both the LTE and LTE-A systems are schedule-based systems, and a base station allocates an uplink resource under a number of criteria including the amount of data in a buffer of a user equipment to be transmitted in the uplink. In order to know this information, the base station requires the user equipment to transmit a Buffer Status Report (BSR) to the base station.

Two timers including a retransmission BSR timer (retxBSR-Timer) and a BSR periodic report timer (periodicBSR-Timer) are adopted in the BSR mechanism of R8. For the retxBSR-Timer, the retxBSR-Timer is started when a BSR is reported for the first time and restarted each time the user equipment obtains a new data transmission resource but not restarted upon retransmission of data. For the periodicBSR-Timer, the periodicBSR-Timer is started when a BSR is reported for the first time and restarted when a long BSR or a short BSR is reported but not restarted when a truncated BSR is reported, where the long BSR includes 3-byte buffer information of 4 sets of logic channels, and the short BSR and the truncated BSR include 1-byte buffer information of only one set of logic channels.

A solution to control a BSR timer in a system with carrier aggregation has been absent in the prior art. The inventors have identified during a study that confliction may arise if BSR timers are controlled as in the R8 in the system with carrier aggregation so that a BSR timer is maintained respectively for each carrier. For example, at time T1, new transmission scheduling is received over a CC1 and a retxBSR-Timer of the CC1 is restarted; and retransmission data is transmitted over a CC2, and a retxBSR-Timer of the CC2 is not restarted. At time T2, the retxBSR-Timer of the CC2 expires while the retxBSR-Timer of the CC1 does not expire, and at this time, it can not be decided whether to trigger a BSR report. In another example, at time T1, an MAC PDU of the CC1 is sufficient to accommodate a long BSR, and at this time a periodicBSR-Timer is restarted; and an MAC PDU of the CC2 is only sufficient to accommodate a truncated BSR, and no periodicBSR-Timer is restarted. At time T2, the periodicBSR-Timer of the CC2 expires while the periodicBSR-Timer of the CC1 does not expire, and at this time, it can not be decided whether to trigger a BSR report either.

SUMMARY OF THE INVENTION

Embodiments of the invention provide a method of and apparatus for controlling a timer on a buffer status report so as to control a timer on a buffer status report in a carrier aggregation-enabled system.

A method, in a User Equipment, UE, in a system with carrier aggregation, of controlling a timer on a Buffer Status Report, BSR, includes:

starting a retransmission BSR timer, retxBSR-Timer, and a BSR periodic report ti periodicBSR-Timer, when a BSR is transmitted over a component carrier in a sub-frame;

restarting the retxBSR-Timer when there is a new data transmission resource over a component carrier in a sub-frame; and restarting the periodicBSR-Timer when a long BSR or a short BSR is transmitted over a component carrier in a sub-flame.

A carrier aggregation-enabled User Equipment, UE, includes:

a retransmission BSR timer, retxBSR-Timer, configured to be started or restarted upon trigger;

a BSR periodic report timer, periodicBSR-Timer, configured to be started or restarted upon trigger; and a control module configured to trigger the retxBSR-Timer and the periodicBSR-Timer to be started when a BSR is transmitted over a component carrier in a sub-frame, to trigger the retxBSR-Timer to be restarted when there is a new data transmission resource over a component carrier in a sub-frame, and to trigger the periodicBSR-Timer to be restarted when a long BSR or a short BSR is transmitted over a component carrier in a sub-frame.

In the embodiments of the invention, a retxBSR-Timer and a periodicBSR-Timer are started when a BSR is transmitted over a component carrier for the first time, and the retxBSR-Timer and/or the periodicBSR-Timer is restarted when a restart condition is satisfied, thereby controlling the timers on a buffer status report in a carrier aggregation-enabled system for an improve BSR mechanism.

DETAILED DESCRIPTION OF THE EMBODIMENTS

In embodiments of the invention, a retxBSR-Timer and a periodicBSR-Timer are started when a BSR is transmitted over a component carrier for the first time, and the retxBSR-Timer and/or the periodicBSR-Timer is restarted when a restart condition is satisfied, thereby controlling the timers on a buffer status report in a carrier aggregation-enabled system and improving BSR mechanism.

Particularly a start condition includes transmission of a BSR over a component carrier. The restart condition of the retxBSR-Timer includes that there is a new data transmission resource over a component carrier. The restart condition of the periodicBSR-Timer includes transmission of a long BSR or a short BSR over a component carrier. That is, the retransmission BSR timer, retxBSR-Tinier, and the BSR periodic report tinier, periodicBSR-Timer, are started when a BSR is transmitted over a component carrier in a sub-frame; the retxBSR-Timer is restarted when there is a new data transmission resource over a component carrier in a sub-frame; and the periodicBSR-Timer is restarted when a long BSR or a short BSR is transmitted over a component carrier in a sub-frame.

Figure 1:
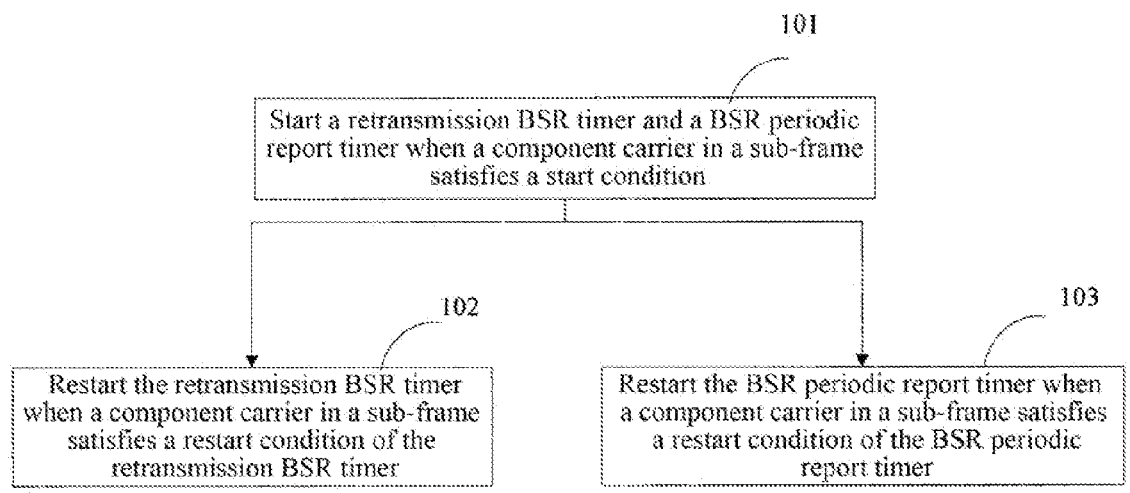
FIG. 1 is a flow chart of a general method of triggering a buffer status report in an embodiment of the invention.

Referring to FIG. 1, a flow of a general method of triggering a buffer status report in the present embodiment is as follows:

Step 101: A retxBSR-Timer and a periodicBSR-Timer are started when a component carrier in a sub-frame satisfies a start condition. Particularly a system configures a UE with a plurality of component carriers and one or more component carriers can be used in a sub-frame.

Step 102: The retxBSR-Timer is restarted when a component a sub-frame satisfies a restart condition of the retxBSR-Timer after the retxBSR-Timer is started.

Step 103: The periodicBSR-Timer is restarted when a component carrier in a sub-frame satisfies a restart condition of the periodicBSR-Timer after the periodicBSR-Timer is started.

In the present embodiment, the UE can include one or more retxBSR-Timers and periodicBSR-Timers, and a CC corresponds to one retxBSR-Timer and one periodicBSR-Timer when there are a plurality of retxBSR-Timers and a plurality of periodicBSR-Timers. A process of triggering a BSR may be slightly different for the foregoing several scenarios and will be detailed below in four embodiments.

Figure 2:
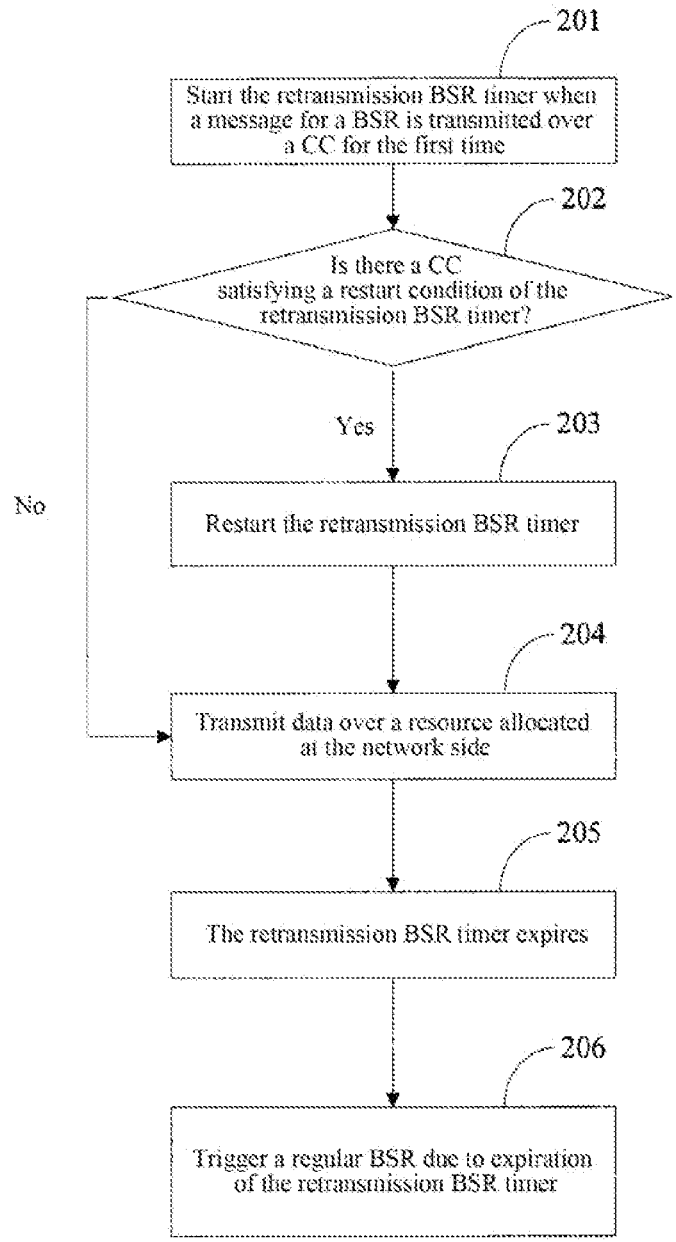
FIG. 2 is a flow chart of a method of triggering a BSR when a UE includes one retxBSR-Timer in an embodiment of the invention.

Referring to FIG. 2, a flow of a method of triggering a SSR when a UE includes one retxBSR-Timer in the present embodiment is as follows:

Step 201: The retxBSR-Timer is started when a BSR is transmitted for the first time. The transmitted BSR can be a long BSR or a short BSR.

Step 202: ft is determined whether there is a CC satisfying a restart condition of the retxBSR-Timer, and if so, then the flow proceeds to the step 203; otherwise, the flow proceeds to the step 204. The restart condition of the retxBSR-Timer includes restarting when there is a new data transmission resource over a component carrier, where restarting can be performed as long as there is a new data transmission resource over any component carrier. The retxBSR-Timer is introduced for the purpose of preventing a loss of a BSR message and retriggering a BSR if necessary.

Figure 3:
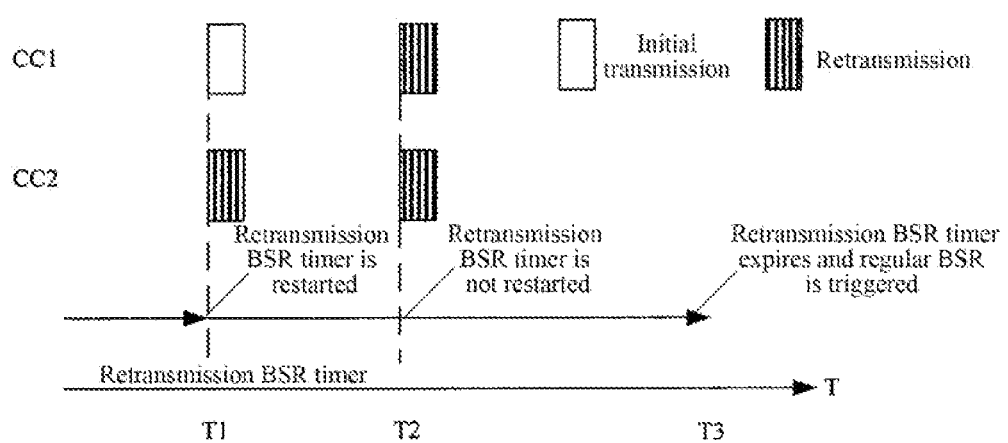
FIG. 3 is a schematic diagram of triggering a BSR when a UE includes one retxBSR-Timer in an embodiment of the invention.

Referring to FIG. 3, for example, there is a new data transmission resource (a resource for new data transmission) over a CC1 and a retransmission resource (a resource for data retransmission) at time T1. Such a condition is satisfied that there is a new data transmission resource in an MAC VDU of any component carrier, the retxBSR-Timer shall be restarted and the flow will proceed to the step 203.

Step 203: The retxBSR-Timer is restarted.

Step 204: Data is transmitted over a resource allocated by the network side. For example, data is initially transmitted over the CC1 and data is retransmitted over a CC2 and the retxBSR-Timer is restarted at time T1. Data is retransmitted over both the CC1 and the CC2 at an time 12, and at this time, the retxBSR-Timer is not restarted.

Step 205: The retxBSR-Timer expires.

Step 206: A regular BSR is triggered due to expiration of the retxBSR-Timer.

Figure 4:
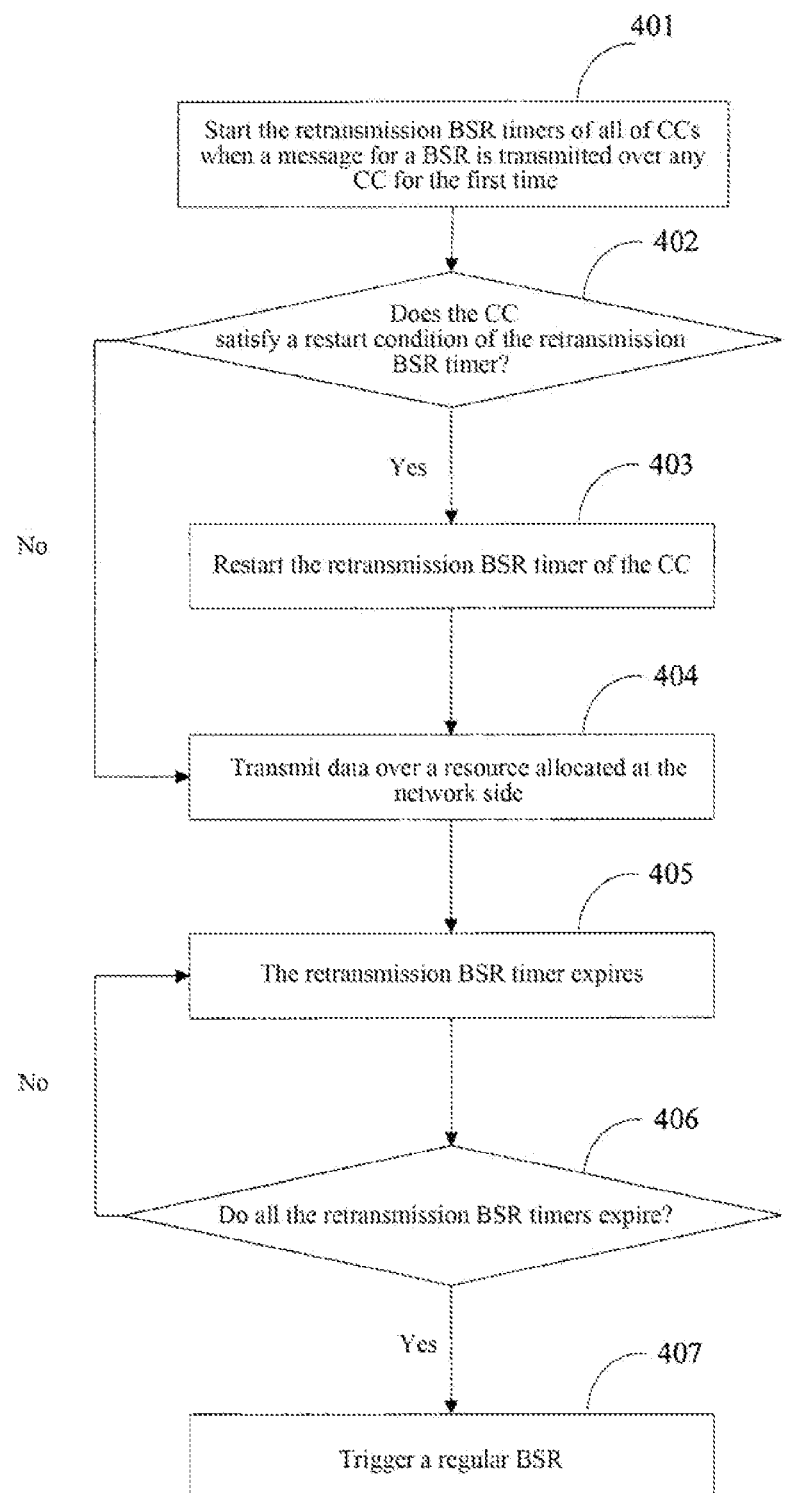
FIG. 4 is a flow chart of a method of triggering a BSR when a UE includes a plurality of retxBSR-Timers in an embodiment of the invention.

Referring to FIG. 4, a flow of a method of triggering a BSR when a UE includes a plurality of retxBSR-Timers in the present embodiment is as follows:

Step 401: The retxBSR-Timers of all of CCs are started when a BSR is transmitted over any CC for the first time. The transmitted BSR can be a long BSR or a short BSR.

Step 402: For a CC, it is determined whether the CC satisfies a restart condition of the retxBSR-Timer, and if so, then the flow proceeds to the step 403; otherwise, the flow proceeds to the step 404.

Figure 5:
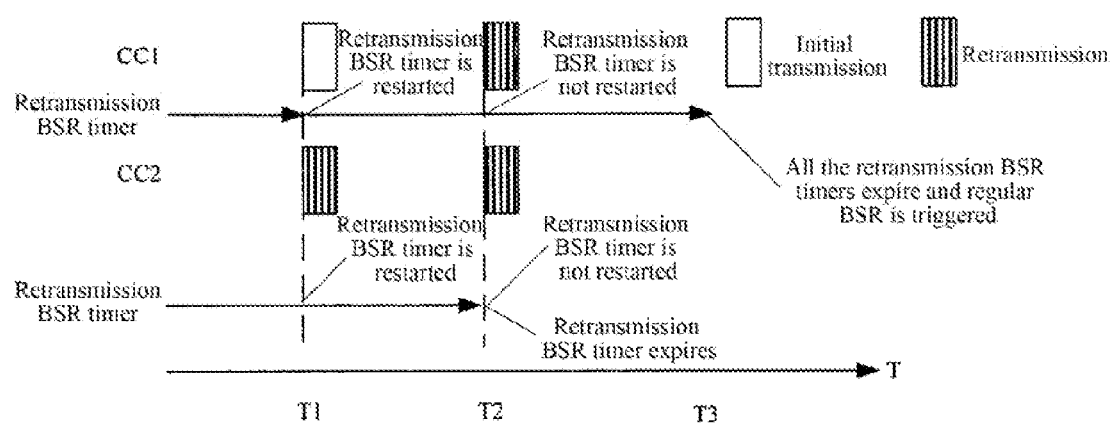
FIG. 5 is a schematic diagram of triggering a BSR when a UE includes a plurality of retxBSR-Timers in an embodiment of the invention.

Referring to FIG. 5, for example, at time T1, there is a new data transmission resource over a CC1 and then the retxBSR-Timer of the CC1 is restarted; and there is a retransmission resource over a CC2, and then the retxBSR-Timer of the CC2 is not restarted. The flow proceeds to the step 403 for the CC1.

Step 403: The retxBSR-Timer of the CC is restarted. That is, the retxBSR-Timer of a component carrier is restarted when the component carrier satisfies the restart condition of the retxBSR-Timer.

Step 404: Data is transmitted over a resource allocated by the network side. For example, initial transmission data is transmitted over the CC1 and retransmission data is transmitted over the CC2 at time T1. Retransmission data is transmitted over both the CC1 and the CC2 at time T2, and at this time, the retxBSR-Timers of the CC1 and the CC2 are not restarted.

Step 405: The retxBSR-Timer expires.

Step 406: It is determined whether all the retxBSR-Timers expire, and if so, then the flow proceeds to the step 407; otherwise, the flow waits for the step 405 to be performed.

Step 407: A regular BSR is triggered. For example, a regular BSR is triggered when all the retxBSR-Timers expire at time T3.

In the present embodiment, the retxBSR-Timer of a CC can alternatively be started when a BSR is transmitted over the CC for the first time. A regular BSR is triggered each time a retxBSR-Timer expires. However this solution triggers a regular BSR more frequently and occupies a more resource than the solution illustrated in FIG. 4. Alternatively the retxBSR-Timers of all the CCs are started when a BSR is transmitted over a CC for the first time, and all the retxBSR-Timers are restarted when there is a CC satisfying the restart condition of the retxBSR-Timer. Since the solution illustrated in FIG. 8 triggers a regular BSR when all the retxBSR-Timers expire with the same effect as and in a simpler restart process than restarting all the retxBSR-Timers.

Figure 6:
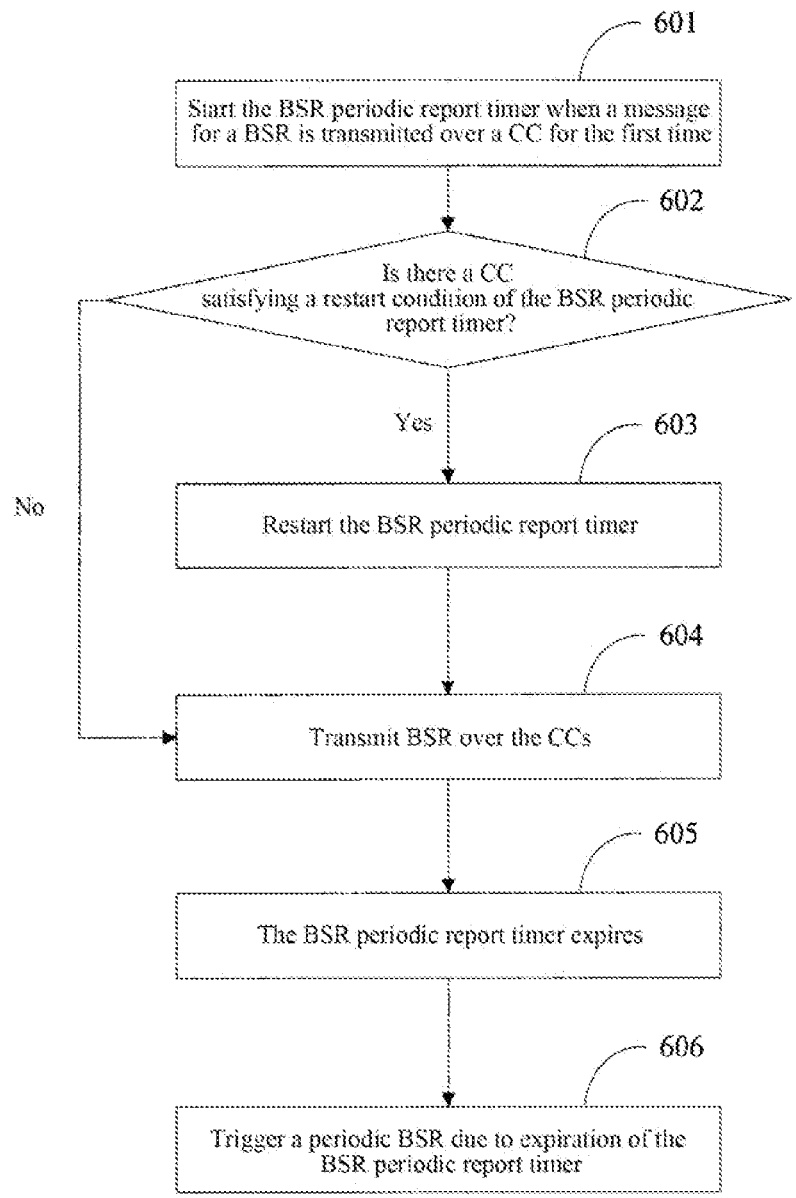
FIG. 6 is a flow chart of a method of triggering a BSR when a UE includes one periodicBSR-Timer in an embodiment of the invention.

Referring to FIG. 6, a flow of triggering a BSR when a UE includes one periodicBSR-Timer in the present embodiment is as follows:

Step 601: The periodicBSR-Timer is started when a BSR is transmitted for the first time. The transmitted BSR can be a long BSR or a short BSR.

Step 602: It is determined whether there is a CC satisfying a restart condition of the periodicBSR-Timer each time a BSR is transmitted, and if so, then the flow proceeds to the step 603; otherwise, the flow proceeds to the step 604. The restart condition of the periodicBSR-Timer includes transmission of a BSR (i.e., a long BSR or a short BSR), including complete buffer information, in an MAC PDU of any CC, which is equivalent to determining whether the transmitted BSR is a long BSR or a short BSR, and if so, then the flown proceeds to the step 603. Particularly a truncated BSR is a BSR including incomplete buffer information.

Figure 7:
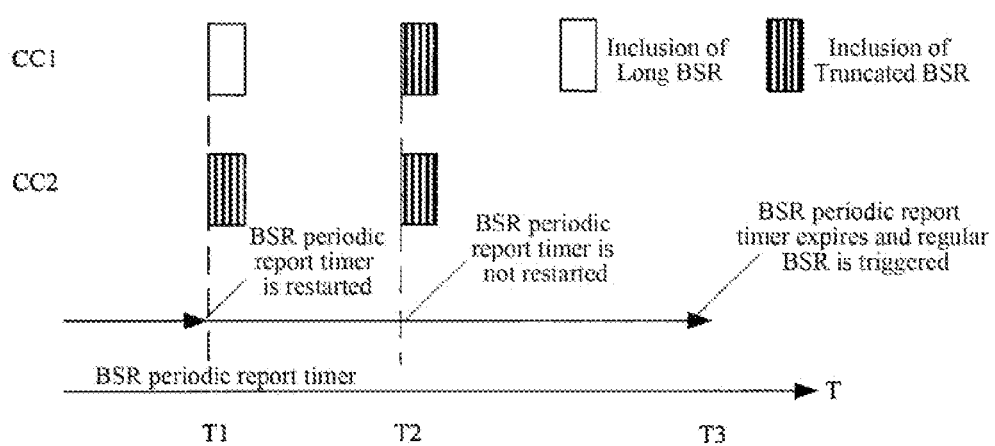
FIG. 7 is a schematic diagram of triggering a BSR when a UE includes one periodicBSR-Timer in an embodiment of the invention.

Referring to FIG. 7, for example, a long BSR is transmitted over a CC1 and a truncated BSR is transmitted over a CC2 at time T1. Such a condition is satisfied that a complete BSR is transmitted in an MAC PDU of any component carrier, the periodicBSR-Timer shall be restarted, and the flow proceeds to the step 603.

Step 603: The periodicBSR-Timer is restarted.

Step 604: BSRs are transmitted over the CCs. For example, a long BSR is transmitted over the CC1 and a truncated BSR is transmitted over the C2 at time T1. Truncated BSRs are transmitted over both the CC1 and the CC2 at time T2, and at this time, the periodicBSR-Timer is not restarted.

Step 605: The periodicBSR-Timer expires.

Step 606: A periodic BSR is triggered due to expiration of the periodicBSR-Timer.

Figure 8:
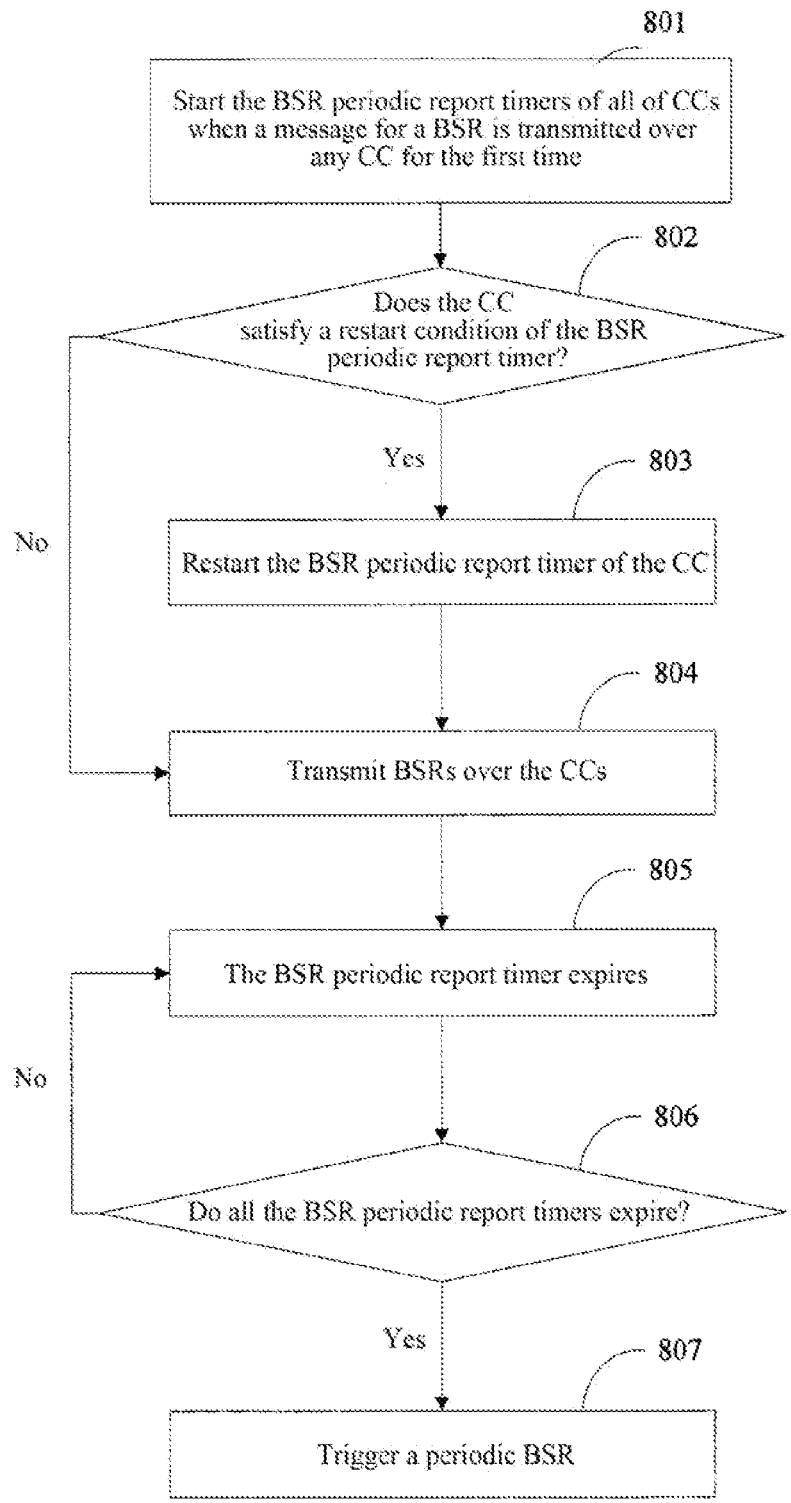
FIG. 8 is a flow chart of a method of triggering a BSR when a UE includes a plurality of periodicBSR-Timers in an embodiment of the invention.

Referring to FIG. 8, a flow of a method of triggering a BSR when a UE includes a plurality of periodicBSR-Timers in the present embodiment is as flows;

Step 801: The periodicBSR-Timers of all of CCs are started when a BSR is transmitted over any CC for the first time. The transmitted BSR can be a long BSR or a short BSR.

Step 802: For a CC, it is determined whether the CC satisfies a restart condition of the periodicBSR-Timer, and if so, then the flow proceeds to the step 803; otherwise, the flow proceeds to the step 804.

Figure 9:
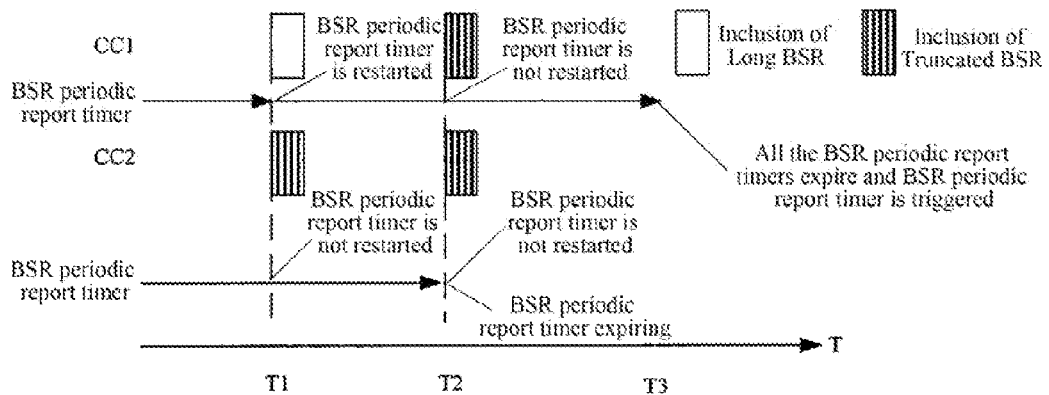
FIG. 9 is a schematic diagram of triggering a BSR when a UE includes a plurality of periodicBSR-Timers in an embodiment of the invention.

Referring to FIG. 9, for example, at time T1, along BSR is transmitted over a CC1 and then periodicBSR-Timer of the CC1 is restarted; and a truncated BSR is transmitted over a CC2, and then the periodicBSR-Timer of the CC2 is not restarted. The flow proceeds to the step 803 for the CC1.

Step 803: The periodicBSR-Timer of the CC is restarted. That is, the periodicBSR-Timer of a component carrier is restarted when the component carrier satisfies the restart condition of the periodicBSR-Timer.

Step 804: BSRs are transmitted over the CCs. For example, at time T1, a long BSR is transmitted over the CC1, and then the periodicBSR-Timer of the CC1 is restarted; and a truncated BSR is transmitted over the CC2, and then the periodicBSR-Timer of the CC2 is not restarted. Truncated BSRs are transmitted over both the CC1 and the CC2 at time T2, and at this time, the periodicBSR-Timers of the CC1 and the CC2 are not restarted.

Step 805: The periodicBSR-Timers expires.

Step 806: It is determined whether all the periodicBSR-Timers expire, and if so, then the flow proceeds to the step 807; otherwise, the flow waits for the step 805 to be performed.

Step 807: A periodic BSR is triggered. For example, a periodic BSR is triggered when all the periodicBSR-Timers expire at time T3.

In the present embodiment, the periodicBSR-Timer of a CC can alternatively be started when a BSR is transmitted over the CC for the first time. A periodic BSR is triggered each time a periodicBSR-Timer expires. However this solution triggers a periodicBSR-Timer BSR more frequently and occupies a more resource than the solution illustrated in FIG. 8. Alternatively the periodicBSR-Timers of all the CCs are started when a BSR is transmitted over a CC for the first time, and all the periodicBSR-Timers are restarted when there is a CC satisfying the restart condition of the periodicBSR-Timer. Since the solution illustrated in FIG. 8 triggers a periodic BSR when all the periodicBSR-Timers expire with the same effect as and in a simpler restart process than restarting all the periodicBSR-Timers.

An implementation process of triggering a BSR has been known from the foregoing description, and this process is primarily performed by a UE. An internal structure and functions of the UE will be described below.

Figure 10:
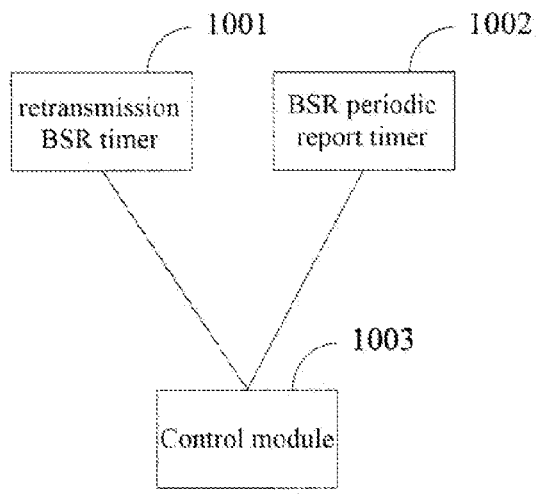
FIG. 10 is a structural diagram of a UE in an embodiment of the invention.

Referring to FIG. 10, a UE in the present embodiment includes a retransmission BSR timer 1001, a BSR periodic report timer 1002 and a control module 1003.

The retransmission BSR tinier 1001 is configured to be started or restarted upon trigger;

The BSR periodic report timer 1002 is configured to be started or restarted upon trigger; and The control module 1003 is configured to trigger the retransmission BSR timer 1001 and the BSR periodic report timer 1002 to be started when a component carrier in a sub-frame satisfies a start condition, to trigger the retransmission BSR timer 1001 to be restarted when a component carrier a sub-frame satisfies a restart condition of the retransmission BSR timer 1001, and to trigger the BSR periodic report timer 1002 to be restarted when a component carrier in a sub-frame satisfies a restart condition of the BSR periodic report tinier 1002.

The UE can include only one retransmission BSR tinier 1001 and one BSR periodic report timer 1002. The control module 1003 restarts the retransmission BSR timer 1001 when a component carrier satisfies the restart condition of the retransmission BSR timer 1001 and restarts the BSR periodic report timer 1002 when a component carrier satisfies the restart condition of the BSR periodic report timer 1002.

The UE can include a plurality of retransmission BSR timers 1001 and a plurality of BSR periodic report timers 1002, and a component carrier corresponds to one of the retransmission BSR timers 1001 and one of the BSR periodic report timers 1002. The control module 1003 starts the retransmission BSR timers 1001 and the BSR periodic report timers 1002 of all of component carriers when a BSR is transmitted over a component carrier for the first time, and restarts the retransmission BSR timer 1001 of a component carrier when the component carrier satisfies the restart condition of the retransmission BSR timer 1001 and restarts the BSR periodic report timer 1002 of a component carrier when the component carrier satisfies the restart condition of the BSR periodic report timer 1002. The control module 1003 triggers a regular BSR when the retransmission BSR timers 1001 of all the component carriers expire and triggers a periodic BSR when the BSR periodic report timers 1002 of all the component carriers expire.

Software for practicing the embodiments of the invention can be stored in a storage medium, e.g., a floppy disk, a hard disk, an optical disk, a flash memory, etc.

In the embodiments of the invention, a retxBSR-Timer and a periodicBSR-Timer are started when a BSR is transmitted over a component carrier for the first time, and the retxBSR-Timer and/or the periodicBSR-Timer is restarted when a restart condition is satisfied, thereby controlling the timers on a buffer status report in a carrier aggregation-enabled system and improving BSR mechanism. Moreover in the embodiments of the invention, a UE can maintain one BSR timer or a BSR timer for each CC to accommodate demands in different scenarios. And when a BSR timer is maintained for each CC, a BSR is triggered when all the BSR timers expire, thereby both satisfying a demand for a buffer status report and saving a network resource.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method, in a User Equipment, UE, in a system with carrier aggregation, of controlling a timer on a Buffer Status Report, BSR, wherein the system includes the UE with a plurality of component carriers and one or more component carriers can be used in a sub-frame, and the plurality of the component carriers correspond to one retransmission BSR timer, retxBSR-Timer, one BSR periodic report timer, and periodic BSR-Timer, the method comprises:

starting the retxBSR-Timer and the periodicBSR-Timer, when a BSR is transmitted over any one of component carriers in a sub-frame;

restarting the retxBSR-Timer when there is a new data transmission resource over any one of component carriers in a sub-frame;

restarting the periodicBSR-Timer when a long BSR or a short BSR is transmitted over any one of component carriers in a sub-frame; and triggering a regular BSR when the retxBSR-Timer expires; and triggering a periodic BSR when the periodicBSR-Timer expires.

2. A method, in a User Equipment, UE, in a system with carrier aggregation, of controlling a timer on a Buffer Status Report, BSR, wherein the system configures the UE with a plurality of component carriers and one or more component carriers can be used in a sub-frame, and each component carrier corresponds to one retransmission BSR timer, retxBSR-Timer, and one BSR periodic report timer, periodicBSR-Timer, the method comprises:

starting the retxBSR-Timers and the periodicBSR-Timers of all component carriers, when a BSR is transmitted over any one of component carriers in a sub-frame;

restarting the retxBSR-Timer corresponding to a component carrier when there is a new data transmission resource over the component carrier in a sub-frame;

restarting the periodicBSR-Timer corresponding to a component carrier when a long BSR or a short BSR is transmitted over the component carrier in a sub-frame; and triggering a regular BSR when all the retxBSR-Timers expire; and triggering a periodic BSR when all the periodicBSR-Timers expire.

3. A carrier aggregation-enabled User Equipment, UE, wherein the UE is configured with a plurality of component carriers and one or more component carriers can be used in a sub-frame, the UE comprising:

one retransmission BSR timer, retxBSR-Timer, configured to be started or restarted upon trigger, wherein the plurality of component carriers of the UE correspond to the one retxBSR-Timer;

one BSR periodic report timer, periodicBSR-Timer, configured to be started or restarted upon trigger, wherein the plurality of the component carriers of the UE correspond to the one periodicBSR-Timer; and a control module configured to trigger the retxBSR-Timer and the periodicBSR-Timer to be started when a BSR is transmitted over any one of component carriers in a sub-frame, to trigger the retxBSR-Timer to be restarted when there is a new data transmission resource over any one of component carriers in a sub-frame, to trigger the periodicBSR-Timer to be restarted when a long BSR or a short BSR is transmitted over any one of component carriers in a sub-frame, and to trigger a regular BSR when the one retxBSR-Timer expires and trigger a periodic BSR when the one periodicBSR-Timer expires.

4. A carrier aggregation-enabled User Equipment, UE, wherein the UE is configured with a plurality of component carriers and one or more component carriers can be used in a sub-frame, the UE comprising:

retransmission BSR timers, retxBSR-Timers, configured to be started or restarted upon trigger, wherein each component carrier corresponds to one retxBSR-Timer, BSR periodic report timers, periodicBSR-Timers, configured to be started or restarted upon trigger, wherein each component carrier corresponds to one periodicBSR-Timer; and a control module configured to trigger the retxBSR-Timers and the periodicBSR-Timers of all component carriers to be started when a BSR is transmitted over any one of component carriers in a sub-frame, to trigger the retxBSR-Timer corresponding to a component carrier to be restarted when there is a new data transmission resource over the component carrier in a sub-frame, to trigger the periodicBSR-Timer corresponding to a component carrier to be restarted when a long BSR or a short BSR is transmitted over the component carrier in a sub-frame, and to trigger a regular BSR when all the retxBSR-Timers expire and trigger a periodic BSR when all the periodicBSR-Timers expire.

* * * * *